UNITED STATES PATENT OFFICE.

CHARLES WEIZMANN, OF LONDON, ENGLAND.

PRODUCTION OF ACETONE AND ALCOHOL BY BACTERIOLOGICAL PROCESSES.

1,315,585.  Specification of Letters Patent.  Patented Sept. 9, 1919.

No Drawing.  Application filed December 26, 1916. Serial No. 138,978.

*To all whom it may concern:*

Be it known that I, Dr. CHARLES WEIZMANN, a subject of the King of Great Britain and Ireland, and residing at 67 Addison road, London, W., England, have invented certain new and useful Improvements Relating to the Production of Acetone and Alcohol by Bacteriological Processes, of which the following is a specification.

This invention relates to the production of acetone and alcohols by fermentation processes, and has for its object to obtain large yields by the fermentation of starchy bodies with or without admixture of other carbohydrates in a simple way.

Hitherto the production of acetone and alcohols by the fermentation of starchy bodies has been effected by means of bacteria *inter alia* by bacteria defined as of the type of Fitz. Fermentation of this kind has always been effected under strictly anaerobic conditions in closed vessels.

I have found that certain heat-resisting bacteria, which are identified by the fact that they will convert the greater part of maize or other grain starch into acetone and butyl alcohol, and will also liquefy gelatin, can be used for the purpose of obtaining large yields of acetone and alcohols by the fermentation of solutions or suspensions of natural substances rich in starch or other carbohydrates mixed with such substances under aerobic or anaerobic conditions, *i. e.*, with free access of air as in yeast fermentation, or without.

My invention consists in the fermentation of solutions or suspensions of natural substances rich in starch or of other carbohydrates mixed with such substances by means of the aforesaid heat-resisting bacteria, under aerobic or anaerobic conditions, substantially as hereinafter indicated, with the production of large yields of acetone and alcohols.

The bacteria in question are found in soil and cereals, *e. g.*, maize, rice, flax, etc.

A convenient method of obtaining the bacteria above referred to is as follows:—

I prepare a number, (say 100), of cultures in the usual way by inoculating *e. g.*, hot (say 90° C. to 100° C.) dilute, (say 2%), sterile maize mash with some maize meal, and then allowing it to ferment at about 35° C. to 37° C. for about four to five days.

From these tubes I select those which show the most vigorous fermentation, and have a pronounced smell of butyl alcohol. These selected tubes I now heat up to from 90° C. to 100° C. for a period of one to two minutes. Many of the bacteria are destroyed, but the desired resistent spores remain. I next inoculate a sterilized maize mash with the culture which has been heated as aforesaid, and so obtain a subculture. I then heat this subculture up to 90° C. to 100° C. for one to two minutes, and use it to inoculate another sterilized maize mash, and repeat the foregoing subculturing operation a number of times, say 100 to 150 times. In these operations no special precautions need be taken for the exclusion of air.

The bacteria above indicated can then be used in the production of acetone and alcohol under aerobic conditions (which I prefer) by inoculating with the final culture a cooled solution or suspension of the selected substratum, *e. g.*, maize, which has been previously sterilized for three to four hours at a temperature of 130° C. to 140° C., and a pressure of 2 to 3 atmospheres.

I find that in the case of maize meal a suitable suspension for inoculation can be formed by 100 parts by weight of maize meal, and 1500 parts by weight of water. Fermentation sets in after five to ten hours. The optimum temperature of the fermentation lies about 35° C. to 36° C.

The fermentation proceeds vigorously for about 36 hours, falling off rapidly after this period, and is completed after a period of about 48 hours. The mash is then distilled, and the products isolated by fractional distillation in the usual way.

I can carry the fermentation into effect under anaerobic conditions in the following manner:—The cooled sterilized maize mash for instance is run into closed tanks in which it can be contained under anaerobic conditions at about 35° C. to 36° C. It is then inoculated with the hereinbefore described final culture, and allowed to ferment. When the fermentation is completed, the mash is distilled, and the products are isolated as before.

I find that the bacteria above indicated will operate successivley on rice, wheat, oats, rye, durra and potatoes as well as maize, and in all these cases without any addition of nutritive materials or stimulants.

The bacteria of the present application, although heat resisting in a sense are not capable of standing the test set by Scheckenbach, in the U. S. Patent 1,118,238, of November 24th, 1914, and are destroyed by any such treatment as are also their spores.

Having now described my invention, what I claim as new and desire to secure by Letters Patent is:—

1. The process of producing acetone and butyl alcohol by the fermentation of liquids containing natural substances rich in starch by means of the herein described bacteria which are capable unaided of converting sterile fermentable grain starch substantially into acetone and butyl alcohol, and also liquefying gelatin.

2. The process of producing acetone and butyl alcohol by the fermentation of liquids containing natural substances rich in starch by means of the herein described bacteria which are capable unaided of converting sterile fermentable grain starch substantially into acetone and butyl alcohol, and also liquefying gelatin, the said fermentation being conducted aerobically as in yeast fermentations.

3. The process of producing acetone and butyl alcohol by the inoculation of a cereal composition with the herein described bacteria which are capable unaided of converting sterile fermentable cereals substantially into acetone and butyl alcohol.

In testimony whereof I have signed my name to this specification.

CHARLES WEIZMANN.